United States Patent [19]
Wyant

[11] 3,829,219
[45] Aug. 13, 1974

[54] SHEARING INTERFEROMETER

[75] Inventor: James C. Wyant, Carlisle, Mass.

[73] Assignee: Itek Corporation, Lexington, Mass.

[22] Filed: Mar. 30, 1973

[21] Appl. No.: 346,365

[52] U.S. Cl.................. 356/107, 356/111, 356/124
[51] Int. Cl. ............................................. G01l 9/02
[58] Field of Search ........... 356/129, 111, 124, 126, 356/169, 106, 107, 109; 350/162 R

[56] References Cited
UNITED STATES PATENTS

| | | | |
|---|---|---|---|
| 2,886,718 | 5/1959 | Shepherd et al. | 356/169 |
| 3,045,531 | 7/1962 | Prescott | 350/162 R |
| 3,320,852 | 5/1967 | Parrent, Jr. et al. | 350/162 R |
| 3,383,978 | 5/1968 | Girard | 350/162 R |
| 3,468,609 | 9/1969 | Sterrett et al. | 356/107 |
| 3,587,063 | 6/1971 | Lamberts et al. | 350/162 R |
| 3,738,753 | 6/1973 | Huntley, Jr. | 356/111 |

Primary Examiner—Ronald L. Wibert
Assistant Examiner—Conrad Clark
Attorney, Agent, or Firm—Homer O. Blair; Robert L. Nathans; William C. Roch

[57] ABSTRACT

A shearing interferometer for producing a shearing interferogram of a wavefront being converged to a focal point. In a first embodiment in which the wavefront is comprised of monochromatic radiation, two diffraction gratings having slightly different line spacings are placed near the focal point of the wavefront. The diffraction gratings produce two first diffraction orders at two slightly different angles which result in a shearing interferogram in the region of overlap. The resulting shearing interferogram yields wavefront information in one direction. Complete wavefront information in two directions may be obtained by shearing the wavefront in two orthogonal directions. This is accomplished by placing two additional diffraction gratings having slightly different line spacings near the focal point of the wavefront and in an orthogonal direction relative to the first two diffraction gratings. In a second embodiment in which the wavefront is comprised of white light, a blazed diffraction grating is introduced into the interferogram. Both the monochromatic and white light interferometers may use heterodyning, real time phase detection. When heterodyning phase detection is used, the irradiance of the interferogram is modulated sinusoidally by translating sideways at least one of the diffraction gratings.

25 Claims, 5 Drawing Figures

SHEARING INTERFEROMETER

BACKGROUND OF THE INVENTION

The present invention relates generally to the field of interferometry wherein two wavefronts are interfered to convert unobservable phase variations into measurable intensity changes. More particularly, the present invention pertains to a new and improved shearing interferometer. Various types of shearing interferometers are known in the prior art. However, these prior art shearing interferometers generally consist of a number of optical elements which have to be precisely aligned. Maintaining alignment is not easy, and as a result these prior art shearing interferometers generally are unstable.

The present invention is basically a grating interferometer and is similar to the Ronchi grating interferometer. Like the Ronchi interferometer the present invention produces a shearing interferogram with a single component and thus is virtually impossible to misalign. However, the present invention has several advantages over a Ronchi interferometer. The present invention may be designed to produce any desired amount of shear while having only two beam interference. In a Ronchi interferometer more than two beams are interfered unless the shear is at least one half of the pupil diameter. Also, with the present invention the two interfering beams always have the same intensity which results in fringes with very good contrast. Also, with the present invention it is very easy to obtain a shearing interferogram simultaneously in two orthogonal directions without the use of a beam splitter. Further the present invention eliminates the problem of obtaining the same Gaussian reference spherical wavefront for each of the two orthogonal shearing interferograms.

SUMMARY OF THE INVENTION

In accordance with a preferred embodiment, a shearing interferometer is disclosed for producing a shearing interferogram of a wavefront. First and second diffraction gratings, each of which has line spacing patterns different from the other, are positioned in the wavefront. The first diffraction grating produces a first, $n$ order, diffracted beam. The second diffraction grating produces a second, $n$ order, diffracted beam which is angularly displaced relative to the first, $n$ order, diffracted beam, but which has a region of overlap with it in which a lateral shearing interferogram is produced. Also, the preferred embodiment provides such an interferometer wherein the diffracted beams which form the lateral shearing interferogram are first order diffracted beams. Also, the preferred embodiment provides such an interferometer for use with a wavefront being converged to a focal point and wherein the first and second diffraction gratings are positioned in proximity to the focal point. Further, the preferred embodiment provides such an interferometer wherein the required diffraction gratings may be all produced on one photographic medium. Also, the preferred embodiment provides such an interferometer which is capable of shearing the wavefront in two orthogonal directions. Also the preferred embodiment provides a very simple and stable lateral shearing interferometer which has a minimum number of components. Further the preferred embodiment is useful for either visual observance of the shearing interferogram or electronic phase measurements in a simple and stable electronic system. Also, the shearing interferometer of the present invention can be used with either monochromatic or white light, point or extended, sources of radiation. Further, the preferred embodiment may be used to obtain wavefront information at many planes, including the exit pupil of an optical system under test.

DESCRIPTION OF A PREFERRED EMBODIMENT

Figure 1:
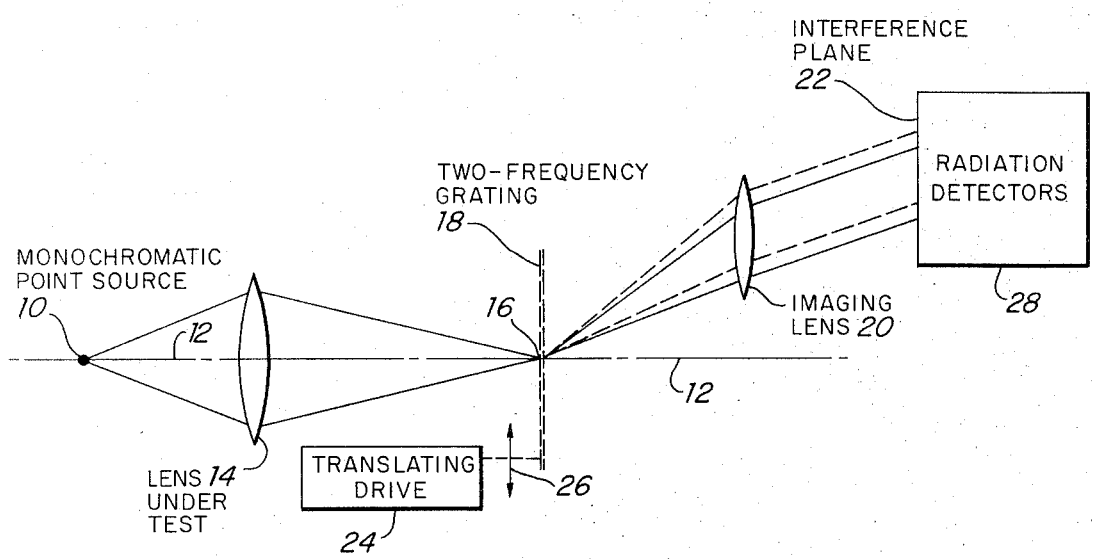
FIG. 1 illustrates a first embodiment of a shearing interferometer for monochromatic radiation constructed according to the teachings of this invention.

Referring to FIG. 1, there is illustrated a lateral shearing interferometer for obtaining shear in one direction for a monochromatic wavefront being converged to a focal point. The type of lateral shearing interferometer described herein has come to be known in the art as the Wyant Interferometer in honor of the inventor James C. Wyant. A monochromatic point source of radiation 10, located on an optical axis 12, emits radiation which is directed by a lens 14 to a focal point 16. The lens 14 produces a wavefront which is being converged toward the focal point 16, and it is the quality of this wavefront which is being tested in the arrangement of FIG. 1. In accordance with the preferred embodiment two diffraction gratings are placed at or near the focal point 16. In the preferred embodiment the two diffraction gratings 18 are both produced on one piece of film. In alternative embodiments the diffraction gratings may be produced on separate elements. The two diffraction gratings have line spacing patterns thereon which are slightly different. The two line spacing patterns may be at different frequencies, or they may be of the same frequency but rotated slightly with respect to each other. Each diffraction grating produces a first order cone of diffracted radiation, and since each grating is slightly different, the two diffracted cones of radiation are angularly displaced with respect to each other. If diffraction gratings with different frequencies are utilized, then the higher frequency grating will diffract the radiation a greater angle as illustrated by the dashed lines in FIG. 1, while the lower frequency diffraction grating will diffract the radiation a lesser angle, as illustrated by solid lines in FIG. 1. There is a region of overlap between the two first order diffracted cones of radiation, and a shearing interferogram is formed in this region of overlap.

In actual practice, there will be light eminating from the diffraction gratings 18 which is not shown in FIG. 1. For instance, there will be zero order undiffracted rays which are continuations of the beam from lens 14. There will also be negative first diffraction orders located below the axis 12 and symmetrical about the axis 12 with the first diffraction orders illustrated in FIG. 1. There will also be positive and negative second diffraction orders, etc. However, in the illustrated embodiment only one first diffraction order is of interest.

The diffraction angles should be chosen large enough to keep the zero order undiffracted rays separate from the first order diffracted rays. This is accomplished as follows. If a wavefront having an $f$ number ($f_{no.}$) is tested, the condition specifying no overlap between the zero undiffracted and the first diffracted orders is:

$f_1 > 1/\lambda f_{no.}$ where $\lambda$ is the wavelength of light, and $f_1$ is the lower spatial frequency of the two grating frequencies.

The amount of shear in the region of overlap is determined by the difference between the two spatial frequencies making up the line patterns of the two diffraction gratings. If $f_1$ and $f_2$ are the two spatial frequencies, the angular shear, $\Delta\theta$, can be approximated as $\Delta\theta = \lambda(f_2 - f_1)$.

The arrangement described thus far would have utility in many situations. For instance, a skilled optician could place a piece of paper in the generated shearing interferogram, and by viewing the interferogram on the piece of paper derive quite a bit of information about the quality of the wavefront being tested. The quality of this wavefront is in turn an indication of the quality of lens 14.

In a more elaborate embodiment, an imaging lens 20 is placed after the diffraction gratings 18 to form an image in an interference plane 22 of the exit pupil of the system under test, which in FIG. 1 is lens 14. Since the diffraction gratings 18 produce two diffracted cones of rays at two slightly different angles, the lens 20 will produce two laterally displaced images of the exit pupil of lens 14. A shearing interferogram will result in the region of overlap of the two displaced images. The imaging lens allows the generation of wavefront information at the exit pupil of the system under test.

Longitudinal displacement of the diffraction gratings 18 along axis 12 and from the focal point 16 changes the Gaussian reference sphere for the interferogram, as in a Ronchi interferometer. Accordingly, the diffraction gratings 18 need not be located exactly at the focal point 16. They need only be located in proximity thereto as such a proximate position will only result in a change to the Guassian reference sphere for the interferogram. Also, the diffraction gratings may be slightly separated as such a slight separation only introduces a slight tilt in the sheared wavefront which can be subtracted easily in a computer analysis of the resulting data. The interferometer of the present invention is preferred for use with a wavefront being converged to a focal point and wherein the diffraction gratings 18 are positioned in proximity to that focal point. This results in the interferogram having a small number of fringes from which it is relatively easy to extract information. If the diffraction gratings are positioned away from the focal point or the focal point is not a well defined point, the resulting interferogram has more fringes and is more difficult to extract information from. Also, the present invention may be utilized with collimated radiation wherein the focal point is considered to be infinity. However, such an arrangement results in many fringes and is difficult to work with. Also, when high spatial frequency diffraction gratings are used, the image of the exit pupil of the optical system will be distorted. Generally this distortion causes no problem. However, if desired, the distortion may be corrected by positioning in the diffracted beam another diffraction grating having a spatial frequency equal to the average spatial frequency of the first and second diffraction gratings. This diffraction grating may be a blazed grating, which typically has a diffraction efficiency of 70% or more.

Figure 3:
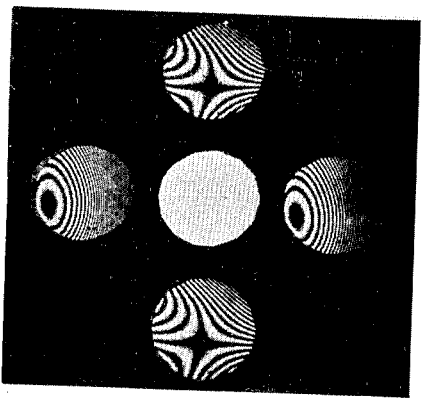
FIGS. 3, 4 and 5 show photographs of various interferograms obtained while utilizing embodiments of this invention.

The system described thus far accomplishes shearing in only one direction, and accordingly yields wavefront information in only one direction. The interferometer of the present invention is capable of shearing the wavefront in two orthogonal directions as follows. Third and fourth diffraction gratings are positioned in proximity to the focal point with their line spacing patterns positioned substantially perpendicular to the first and second line spacing patterns. Also, the line spacing patterns of the third and fourth diffraction gratings are slightly different, as with the first and second diffraction gratings, such that the two first order diffracted cones of radiation produced by the third and fourth diffraction gratings are angularly displaced with respect to each other. This will result in the wavefront being sheared in two orthogonal directions, which yields information about the wavefront in the two directions. In the preferred embodiment all of the first, second, third and fourth diffraction gratings are produced on one piece of film. A typical set of interferograms resulting from shearing in two orthogonal directions is illustrated in FIG. 3. FIG. 3 illustrates interferograms produced by the plus and minus first diffraction orders along the X axis, and interferograms produced by the plus and minus first diffraction orders along the Y axis. During normal utilization of the teachings of this invention, only one interferogram in X and only one interferogram in Y is required to yield complete wavefront information along the X and Y axis.

The Wyant Interferometer lends itself well to real time, AC, heterodyning phase measurements as follows. A requirement for being able to use heterodyning phase detection is that the irradiance of the fringe pattern should vary sinusoidally with time. If the irradiance of the fringe pattern can be written as: $a + b\sin[wt + \phi(X,Y)]$, the phase differences, $\phi(X,Y)$ may be measured by determining electronically the time, $t$, at which $\sin[wt + \phi(X,Y)]$ passes through zero for different points in the fringe pattern. In the shearing interferometer of the present invention, the irradiance of the interferogram may be made to vary sinusoidally with time by translating at least one grating sideways in the direction perpendicular to the direction of its diffraction pattern. It can be shown that such a moving grating causes a doppler shift in the diffracted light, just as scattered light from a moving target is frequency shifted. If $v$ is the component of the translational velocity of the grating perpendicular to the grating lines, and $f_1$ and $f_2$ are the two spatial frequencies of the diffraction gratings, then one first order diffracted beam is frequency shifted by an amount $f_1$ and the other is frequency shifted an amount $f_2$. Therefore the difference in optical frequencies, $\Delta f$, of the two first order diffraction beams if given by: $\Delta f = v(f_2 - f_1)$. Since the two interfering wavefronts differ in optical frequency by an amount $\Delta f$, the irradiance of the resulting lateral shearing interferogram will vary sinusoidally with time at a frequency $\Delta f$ and real time, heterodyning phase detection may be used. FIG. 1 illustrates a translating drive system 24 for moving the diffraction gratings 18 in the direction of arrow 26. In one embodiment of the invention, the translating drive system 24 was an electromagnetic drive similar to a moving coil loudspeaker movement. Such an electromagnetic drive allows the diffraction gratings 18 to be moved at whatever translational velocity is desired.

It should be noted that if two separate diffraction gratings are utilized, a higher modulation frequency may be obtained if only one diffraction grating is translated. Thus, AC heterodyning phase detection may be accomplished by moving either one diffraction grating or by moving both diffraction gratings. If the shearing interferometer is providing shear in both X and Y directions, and the first, second, third and fourth diffraction gratings are all produced on one photographic medium, then simultaneous heterodyning in X and Y may be obtained by translating these gratings along an axis which has components in both X and Y. This axis might be located at 45° relative to the X and Y directions.

When AC, heterodyning phase detection is utilized, the irradiance of the interferogram is detected by detectors 28 at a plurality of points in the interference plane 22. Phase differences between the plurality of points may be utilized to determine the shape of the wavefront. The radiation detectors 28 may be an array of solid-state photodetectors, or in alternative embodiments other means might be utilized to detect the irradiance at the plurality of points. For instance mechanical scanning with an appropriate aperture and one photodetector might be utilized, or alternatively an image dissector with electronic scanning could be used. The phase differences between points on the wavefront represent optical path differences between those points. Each phase difference measurement is then a measurement of a wavefront difference. Thus, the incident wavefront shape may be derived from the measurement of wavefront differences from point to point across the interference plane 22.

Figure 2:
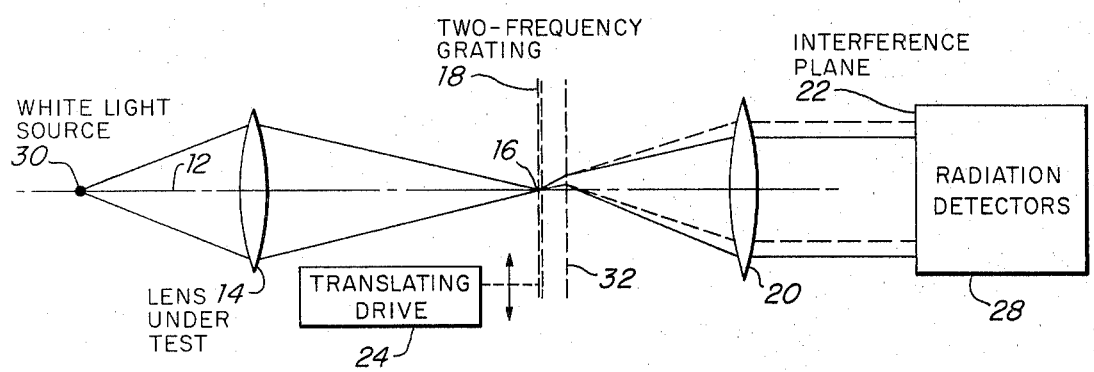
FIG. 2 shows a second embodiment of a shearing interferometer for white light constructed according to the teachings of this invention.

FIG. 2 shows an embodiment of the Wyant Interferometer constructed for use with white light. White light from a source 30 is directed by an achromatic lens 14 to a focal point 16. Similar to the embodiment of FIG. 1, first and second diffraction gratings 18 produce first and second diffracted cones of radiation which are angularly displaced relative to each other. An achromatizing diffraction grating 32, which may be a blazed grating, is placed in the interferogram following the diffraction gratings 18. The line spacing frequency of the achromatizing grating is selected to be the average of the two frequencies of the first and second diffraction gratings. As shown in FIG. 2, after being diffracted twice the rays are nearly parallel to the initial ray direction. The angles the rays make to the initial ray direction are proportional to the wavelength of each ray. For one of the emerging beams, the rays make a positive angle with respect to their initial direction, and for the other beam the rays make a negative angle with respect to their initial direction. This means that the shear is proportional to the wavelength. Since the optical path difference for a defocused beam is proportional to the amount of shear and the fringe spacing is inversely proportional to wavelength for a given path difference, it then follows that the fringe spacing is the same for all wavelengths. Also, the fringe positioning is the same for all wavelengths. Accordingly, sharp black and white fringes are obtained even with a very large amount of defocus. For other wavefront errors, the fringes will become only slightly blurred with color, and since the blurring decreases as the measured wavefront error decreases, this characteristic does not set a limit to the measuring accuracy.

The embodiments in FIGS. 1 and 2 show respectively monochromatic and white light point sources of radiation. The interferometer can also be used with an extended source of radiation if an appropriate mask is placed in front of the extended source. For an extended source, the illuminance of the light at any point in the interferogram is equal to the sum of the illuminance produced by all of the individual points making up the extended source. As is well known, a slit source can be used with a lateral shear interferometer as long as the small direction of the slit is in the shear direction. It can be shown that if the width of the slit as imaged on the grating is $\Delta x$ and T is the period of the beat frequency $(f_2-f_1)$ of the first and second frequencies in the first and second gratings, then the contrast C of the fringes will be given by:

$C = \sin(2\pi\Delta X/T)/(2\pi\Delta X/T)$

With this embodiment as the two frequency grating is translated sideways the illuminance at all points in the interferogram varies sinusoidally at a frequency proportional to the beat frequency of the two gratings. Likewise, as a slit source is moved in a direction perpendicular to the length of the slit, the illuminance at all points in the interferogram also varies sinusoidally at a frequency proportional to the beat frequency of the two gratings. Since moving the image of the slit one period T does not change the interferogram, then periodic slits will give the same contrast as a single slit if the spatial frequency of the periodic slits imaged on the grating is the same as the beat frequency of the two frequency grating. Thus, an extended source of radiation may be used if an appropriate coarse grating, having a selected frequency such that its image at the diffraction gratings 18 is at the beat frequency $f_2-f_1$, is placed in front of the source. In such an arrangement the system under test must of course be corrected over the field of view of the source.

Figure 4:
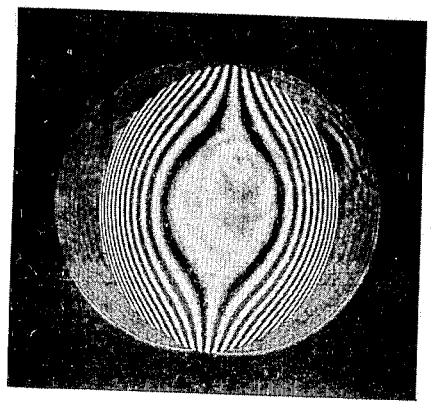
Figure 5:
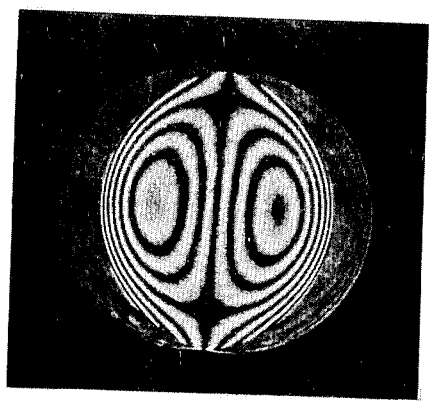

As an example of one embodiment of this invention which was actually built, the interferograms of FIGS. 4 and 5 were obtained while utilizing the teachings of this invention with the following optical setup. A helium-neon laser having an output at 6328 Angstroms was imaged by a microscope objective to a point source. The lens under test had a two inch diameter and a six inch focal length, and was positioned approximately 12 inches from the point source. First and second diffraction gratings having line spacing patterns of 290 lines per millimeter and 310 lines per millimeter were placed at the focal point of the lens under test. The interferograms of FIGS. 4 and 5 were the results of that test. The two interferograms illustrate that the lens under test has spherical aberration. As can be seen, the interferograms have very good contrast. Between the taking of the two interferograms illustrated in FIGS. 4 and 5, the photographic film containing both diffraction gratings 18 was moved along axis 12 to change the Gaussian reference sphere for the two interferograms. For the interferogram of FIG. 4, the diffraction gratings were placed near the paraxial focus of the lens, while for the interferogram of FIG. 5 the diffraction gratings were placed near the marginal focus of the lens.

The illustrated embodiments in this application have obtained shearing interferograms while utilizing the first diffraction orders. In some instances, it may be desirable to utilize the second or higher diffraction orders. The interferograms generated by the second diffraction orders have twice the amount of shear as the interferograms generated by the first diffraction orders.

The diffraction gratings 18 may be produced holographically on a single photograph plate or medium as follows. Two plane waves are interfered at an angle $\theta$, and the interference pattern is recorded on a photographic medium. The two plane waves are then interfered at a slightly different angle, and a second exposure is then made on the same photographic medium. Alternatively, the angle between the two plane waves may be maintained constant, and the grating frequency may be changed by rotating the photographic plate about an axis which lies in the plane of the medium and is parallel to the interference fringes. When shearing in two directions is desired, two holographic exposures may be made as just described. The photographic medium is then rotated 90°, and the exposures are repeated. This results in the one photographic medium having the required first, second, third and fourth diffraction gratings commonly exposed thereon. With the techniques described above it is very easy to create various sets of holograms giving various amounts of shear. While a process has been described for producing the diffraction gratings on a photographic medium, other embodiments of this invention might have the diffraction gratings produced on other mediums.

The Wyant Interferometer has many applications other than those already given. For instance, it can be used to find the focus of a lens. When the diffraction gratings are placed at the focus of an aberration free lens, one fringe will cover the entire pupil. Accordingly, the diffraction gratings may be displaced along the optical axis until the position is determined at which one fringe covers the pupil. Also, the present invention may be utilized to determine the focus of the different zones of a lens having spherical aberration, as well as the sagittal and tangential focus of an astigmatic lens.

Another useful feature of the present invention in the testing of optical systems is that it measures the quantity of primary interest as far as image formation is concerned, namely the wavefront difference function. A lateral shearing interferometer measures the phase difference between points in the wavefront separated by the shear distance. There is a very close relationship between a shearing interferogram and the optical transfer function of an optical system. In fact, a lateral shearing interferometer can be used to measure the optical transfer function of an optical system directly by measuring the amount of light in the interferogram, as is known in the art. It can also be shown that for an optical system the drop in the modulation transfer function below its theoretical diffraction limit for a particular spatial frequency can be obtained directly from a shearing interferogram by measuring the root mean square deviation from straightness of the fringes in the interferogram.

Also the present invention may be utilized to determine index gradients of mediums, such as gasses or liquids, through which light is passed.

Further, the present invention may be utilized to determine the direction and magnitude of vibration of a vibrating body. A crossed diffraction grating is placed on the body, and then interferometric measurements are made while the body is vibrating.

While several embodiments have been described, the teachings of this invention will suggest many other embodiments to those skilled in the art.

I claim:

1. A system for producing a shearing interferogram of a wavefront being converged to a focal point and comprising:
   a. a first diffraction grating positioned in the wavefront in proximity to said focal point for producing a first, $n$ order, diffracted beam, said first diffraction grating having a first line spacing pattern; and
   b. a second diffraction grating positioned in the wavefront and in proximity to said focal point and said first diffraction grating for producing a second, $n$ order, diffracted beam wherein said first and second $n$ order diffracted beams are the same order, said second diffraction grating having a second line spacing pattern which is different from said first line spacing pattern such that said second diffracted beam is angularly displaced relative to said first diffracted beam but has a region of overlap with said first diffracted beam in which a lateral shearing interferogram is produced.

2. A system as set forth in claim 1 wherein said first diffraction grating and said second diffraction grating are both produced on one medium.

3. A system as set forth in claim 1 wherein the wavefront is sheared in two orthogonal directions and wherein the system further includes:
   a. a third diffraction grating positioned in the wavefront in proximity to said focal point for producing a third, $n$ order, diffracted beam, said third diffraction grating having a third line spacing pattern which is positioned substantially perpendicular to said first and second line spacing patterns; and
   b. a fourth diffraction grating positioned in the wavefront in proximity to said focal point for producing a fourth, $n$ order, diffracted beam wherein said third and fourth diffracted beams are the same order, said fourth diffraction grating having a fourth line spacing pattern which is positioned substantially perpendicular to said first and second line spacing patterns and which is different from said third line spacing pattern to produce a fourth, $n$ order, diffracted beam which is angularly displaced relative to said third, $n$ order, diffracted beam in which a second lateral shearing interferogram is produced, whereby the wavefront is sheared in two orthogonal directions to allow complete wavefront information in two directions to be obtained.

4. A system as set forth in claim 3 wherein said first diffraction grating, said second diffraction grating, said third diffraction grating and said fourth diffraction grating are all produced on one medium.

5. A system as set forth in claim 1 wherein the system uses heterodyning, real time phase detection and includes means for translating sideways at least one of said diffraction gratings in a direction perpendicular to its line spacing pattern.

6. A system as set forth in claim 5 wherein the system includes means for electronically detecting the irradiance of the interferogram at a plurality of points in the interferogram, whereby phase differences in the irradiation of the interferogram between said plurality of points may be determined.

7. A system as set forth in claim 6 wherein said detecting means includes an array of photodetectors positioned to detect the irradiance of the interferogram.

8. A system as set forth in claim 6 wherein said n orders are first diffraction orders.

9. A system as set forth in claim 1 wherein the system is adapted to be utilized with a wavefront comprised of white light and wherein a first achromatic diffraction grating is positioned in the interferogram produced by said first and second diffraction gratings.

10. A system as set forth in claim 9 wherein:
 a. said first diffraction grating has a first line spacing pattern at a first frequency $f_1$;
 b. said second diffraction grating has a second line spacing pattern at a frequency $f_2$, different from $f_1$; and
 c. said first achromatic diffraction grating has a line spacing pattern at a frequency which is substantially the average of $f_1$ and $f_2$.

11. A system as set forth in claim 10 wherein the wavefront is sheared in two orthogonal directions and wherein the system further includes:
 a. a third diffraction grating positioned in the wavefront in proximity to said focal point for producing a third, n order, diffracted beam, said third diffraction grating having a third line spacing pattern at a frequency $f_3$ which is positioned perpendicular to said first and second line spacing patterns;
 b. a fourth diffraction grating positioned in the wavefront in proximity to said focal point for producing a fourth, n order, diffracted beam wherein said third and fourth diffracted beams are the same order, said fourth diffraction grating having a fourth line spacing pattern at a frequency $f_4$, different from the frequency $f_3$, which is positioned substantially perpendicular to said first and second line spacing patterns to produce a fourth, n order, diffracted beam which is angularly displaced relative to said third, n order, diffracted beam and which has a region of overlap with said third, n order, diffracted beam in which a second lateral shearing interferogram is produced; and
 c. a second achromatic diffraction grating positioned in said second lateral shearing interferogram, said second achromatic grating having a line spacing pattern at a frequency which is substantially the average of $f_3$ and $f_4$.

12. A system as set forth in claim 11 wherein said first diffraction grating, said second diffraction grating, said third diffraction grating and said fourth diffraction grating are all produced on one medium.

13. A system as set forth in claim 12 wherein the system uses heterodyning, real time, phase detection and includes means for translating said photographic medium in a direction such that it has a component of motion perpendicular to said line spacing patterns of said first and second diffraction gratings and a component of motion perpendicular to said line spacing patterns of said third and fourth diffraction gratings.

14. A system as set forth in claim 13 wherein said n orders are first diffraction orders.

15. A system as set forth in claim 1 and further including:
 a. a first optical system which is to be tested by the system and positioned to produce the wavefront; and
 b. a second optical system positioned in said lateral shearing interferogram to form an image of the exit pupil of said first optical system in an interference plane whereby said first and second diffraction gratings result in two laterally displaced images of the exit pupil in said interference plane but with a region of overlap in which a lateral shearing interferogram is produced.

16. A system as set forth in claim 15 wherein the system includes means for electronically detecting the irradiance of the interferogram at a plurality of points in the interference plane, whereby phase differences in the irradiation of the interferogram between said plurality of points may be determined.

17. A system as set forth in claim 16 wherein said n orders are first diffraction orders.

18. A system as set forth in claim 1 wherein said n orders are first diffraction orders.

19. A system as set forth in claim 1 wherein said n orders are second diffraction orders.

20. A system as set forth in claim 1 wherein said first line spacing pattern is at a frequency $f_1$, and said second line spacing pattern is at a frequency $f_2$, different from $f_1$.

21. A system as set forth in claim 1 wherein said first line spacing pattern and said second line spacing pattern are both at the same frequency, and said second line spacing pattern is different from said first line spacing pattern in that it is rotated slightly with respect to said first line spacing pattern.

22. A system for producing a shearing interferogram of a wavefront and comprising:
 a. first diffraction means positioned in the wavefront for producing a first, n order, diffracted beam;
 b. second diffraction means positioned in the wavefront in proximity to said first diffraction means for producing a second, n order, diffracted beam wherein said first and second n order beams are the same order and which second beam is angularly displaced relative to said first, n order, diffracted beam, but having a region of overlap with said first, n order, diffracted beam in which a lateral shearing interferogram is produced, said first and second n order diffracted beams being the same order; and c. means for detecting the irradiance of the lateral shearing interferogram produced by said first and second diffracted beams at a plurality of locations in the interferogram, whereby phase differences between the plurality of locations may be ascertained to determine the shape of the wavefront.

23. A system as set forth in claim 22 wherein the wavefront is sheared in two orthogonal directions and wherein the system further includes:
 a. a third diffraction means positioned in the wavefront for producing a third, n order, diffracted beam, said third, n order diffracted beam being diffracted in a direction substantially perpendicular to the direction of diffraction of said first and second diffracted beams;
 b. a fourth diffraction means positioned in the wavefront in proximity to said third diffraction means for producing a fourth, n order, diffracted beam wherein said third and fourth n order beams are the same order and which fourth beam is diffracted in a direction substantially perpendicular to the direction of diffraction of said first and second diffracted beams and is angularly displaced relative to said third, $n$ order, diffracted beam but having a region of overlap with said third, $n$ order diffracted beam in which a lateral shearing interferogram is produced, said third and fourth $n$ order diffracted beams being the same order; and c. means for detecting the irradiance of the lateral shearing interferogram produced by said third and fourth diffracted beams at a plurality of locations in the interferogram, whereby phase differences between the plurality of locations may be ascertained to determine the shape of the wavefront.

24. A system as set forth in claim 23 wherein each of said detecting means includes an array of photodetectors.

25. A system as set forth in claim 22 wherein said detecting means includes an array of photodetectors.

* * * * *